Sept. 2, 1941.  H. E. IRWIN  2,254,485
AIRCRAFT AND ITS CONTROL
Filed June 8, 1939   2 Sheets-Sheet 1
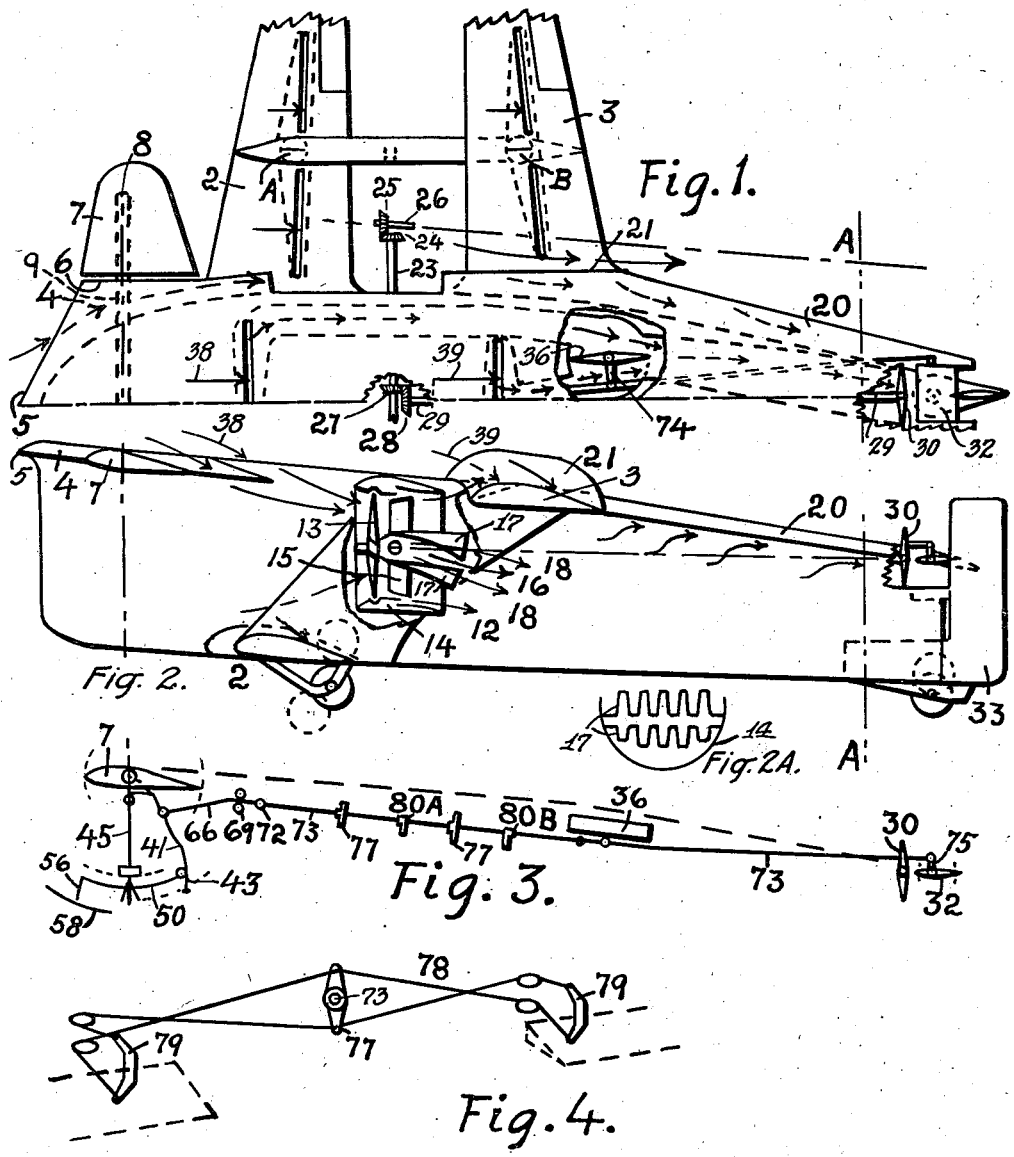
WITNESS
Harold J. Irwin
INVENTOR
Herbert E. Irwin

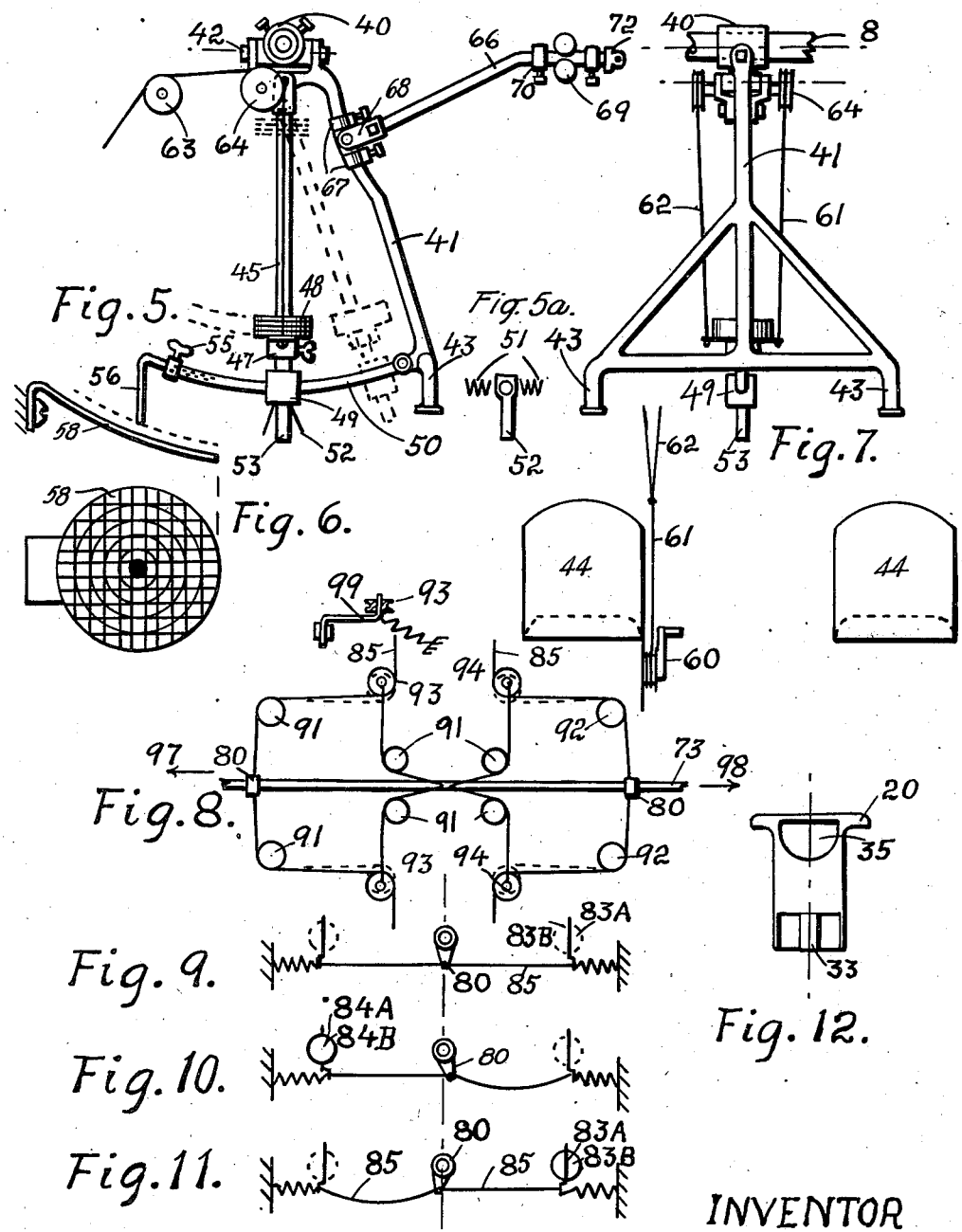

Patented Sept. 2, 1941

2,254,485

UNITED STATES PATENT OFFICE 2,254,485

AIRCRAFT AND ITS CONTROL

Herbert Ellwood Irwin, Barons, Alberta, Canada

Application June 8, 1939, Serial No. 278,104

11 Claims. (Cl. 244—13)

My invention relates to improvements in or relating more particularly to aircraft controls to take place at zero or any speeds and also the shape of the fuselage and its added surfaces that control the flow or density of air around the outside surfaces in such a way as to effect added lift and maintain an upright balanced condition or influence.

This invention is an improvement on my United States Patent Number 1,883,740, dated October 18, 1932, which made use of side tiltable propellers. This airplane patented invention lacked control at slow speeds, therefore a need for improvements.

My present invention is also an improvement on my United States patent having a subject "Propelling mechanism for aircraft and vehicles," Number 2,138,034, dated November 29, 1938, which dealt with three types of thrusts, namely: thrust by side and rear propellers, thrust by side tiltable outside cowl rings, and a vertical thrust by what I call an "air drainage system for aircraft."

I have a number of objects for my present invention; the first one, safe control at fast, slow or zero forward speed. One of the objects is an automatic longitudinal and lateral control employing a weighted pendulum, without the use of electricity. Another object is to use a pendulum weighted arm and a control arm with a handle or handles thereon, the two arms adjustably secured one to the other so that the automatic feature will provide for an angle of climb and an angle of decline or level flight as the case may be from time to time. Another object is a method to lift the weight, to overcome for a desired time, the use of the automatic feature. Still another object is to use a finger on the control arm as indicator over a dial to show the positions of the controls. The pilot may know by a glance at the indicator dial and finger over it just what the automatic device is doing by the movements back and forth and from side to side over the bull's-eye. An adjustment of the finger to an in and out known position as marks thereon to indicate the aircraft's angle of climb.

A further object is to use right and left tiltable wings to act as front elevators; the same to be placed in front of the aircraft's center of gravity, and in front of the aircraft's right and left propellers and secured rigidly to a cross shaft that passes through the fuselage forward end near its roof.

Also another object is the control of air flow in the path of the fuselage by extending the top surface of the fuselage to the right front and to the left front thereby overhanging the fuselage front end and sides to bring about three advantages: one being to direct the air that is divided at the fuselage front vertical corner or rounded part so that one half of the air will go to the right and the other half to the left and continue on around the sides under the overhanging narrow shelf member into the propellers in maximum air density, for propeller efficiency; the second advantage being the dynamic pressure for lift under the overhanging narrow shelf member due to increased air density; the third advantage being to direct the air flow around the fuselage front part under the overhanging narrow shelf member to prevent the denser air from moving up over the fuselage top thereby interfering with the degree of vacuum above.

Still a further object is to design an aircraft that has its fuselage top surface, in normal level flight, to be high in front and continue downwards all the way back to its rear end, thus causing a lift influence as the top surface of a wing while in flight.

Another object is to place a pusher propeller of small size next to the back end of a wide downwardly sloping fuselage top surface, thus to suck off the air from above this top surface to get a large lift drag ratio. Due to a part of the right and left slip-streams going over the top back wings, in normal flight, an opportunity exists to allow these slip-streams to turn sideways over the fuselage rear end and destroy the foregoing object's advantage. Therefore a further object is to place right and left vertical fins in such a place on the wing top to head off this objectionable air flow.

Not only is the small pusher propeller to suck off directly the air from off the fuselage rear top surface by the upper part of the sweep of the propeller blades but also to suck down through air ports placed in the fuselage top surface, one of these ports being in front of the aircraft's center of gravity. This suction is to take place at the lower part of the propeller blade sweep where the outlet of the air drainage system is located, thus the air passing through the rear propeller only comes from off the fuselage top surface for lift.

The very process of removing air from off the fuselage top surface brings about a desired effect for balance, as a weight of the fuselage as a whole would tend to hang below this top surface where the air is less dense. The same is one of the factors to make my design airworthy. Now take the conventional airplane in flight and notice the position of the lower surface of the fuselage to be higher up at the rear end than at the lower surface further forward. The result would tend to cause the back end of the fuselage to move downwards as a drag, in flight, due to the upward movement of the air that passes back under fuselage to go up to fill the hole or space in the air made by the fuselage. Furthermore the said fuselage would tend to roll over and turn upside down and put the weight of the fuselage as a whole below the surface that has the lowest air pressure thereon. In flight my designed aircraft's lowest part of the fuselage undersurface is at the rear end.

A book, having a name, "Simplified Aerodynamics," is used by students in the study of aerodynamics. Reference is now made to this book and on page 239 is Fig. 160 showing ports in the wing top surface. The following is a quotation from page 238: "By applying suction to the interior of the wing as in Fig. 160, it is possible to prevent the break-down of the flow up to angles of incidence as high as 45 degrees, and to secure a lift three times as great as the normal maximum lift." This is a most extraordinary statment. Maximum lift for most wings takes place at about 14 degrees angle of incidence and beyond this angle the lift drops off abruptly. Applicant's designed aircraft should be able to fly at a very high angle of climb, far greater than 14 degrees, due in part to the airdrainage system used.

The following description illustrating the preferred embodiment of my invention taken with the accompanying drawings which form a part thereof, and in which:

Fig. 1 is a top view of ½ of the aircraft with several parts broken off. Fig. 2 is a side view of my aircraft with parts broken off. Fig. 2A is an outline drawing showing air outlet of wing 17 as seen from the rear in Fig. 2. Fig. 3 is a side view of the longitudinal control rod and tiltable front wing with a weighted control arm, a two way air valve and a rear elevator. Fig. 4 is a sketch view showing a plan of aileron control by my control rod. Fig. 5 is an enlarged side view of my pendulum arm and control arm. Fig. 5a is a view of a locking trigger and springs for same. Fig. 6 illustrates my dial, the same is used to show as an indicator the balanced position of my aircraft. Fig. 7 is a back view of control arm and seats with the control rod removed. Figures 8, 9, 10 and 11 are sketches to illustrate the method of operating wing valves. Fig. 12 is a sectional view at line AA near the end of the fuselage.

The fuselage is indicated by 1, front-lower wing by 2, the upper-back wing by 3, the front top narrow shelf member by 4, with its front edge as 5 and with parallel side edges as 6, tiltable wings as 7, the tiltable wings being rigidly secured to and supported by shaft 8. Bearings 9 give support to said shaft and are located in the front top narrow shelf member near edge 6. The lower under surface of the fuselage is indicated by 10 and is a flat surface with a slight upturn at the front end.

My side propeller unit is shown in cross section in Fig. 2. Arrow 12 indicates the flow of air from the cowl ring air outlet. Propeller blades 13 force air backwards. When in rotation, a portion of the air driven by the propeller goes back between the cowl ring 14 and the air deflecting member 15 thus causing a suction action to take place at the air outlet. Arrow 16 indicates the flow of air out of the rear end opening of the air outlets at the vertical outlets of said wing 17, as shown by Fig. 2A. Said sketch is an outline drawing of the rear end part of the propeller wing 17, showing air outlets of corrugated pattern as seen from the rear in Fig. 2. The slip-stream's rush back over and under the hollow propeller wings 17 is the influence that acts as a suction fan to draw air out at the air outlets.

At a time when a propeller is turning on a vertical axis near the ground, back air pressure will tend to build up against the ground, as the air tends to stop at the ground before moving sideways, thereby giving added thrust to the propeller. This condition takes place by my aircraft when the side units are turned to direct the slipstreams downwards against the ground. Not only is there added lift by the units but there is a greater air density beneath my aircraft fuselage and wings to give added lift influence; this feature should not be overlooked. Again when a propeller is in rotation on a horizontal axis and located near a wall, the air from the slip-stream tends to stop at the wall and increase in air density, thus the air density is similar to the air going against the ground, and gives a greater thrust by the propeller. Let the letter "$x$" equal the amount of air weight passing through my propeller blades 13 as in Fig. 2 and when the blades are in rotation the slip-stream from the blades pass the air outlets in the cowl ring and also the air outlet in the propeller wing thus a large amount of extra air is added to the slip-stream. Let the letter "$y$" equal the air weight coming through the air outlets, then the total air weight back of the propeller blades will equal the amount $x$ plus $y$, thus a very large amount of air is back of the blades to give a greater thrust by the propeller blades.

Tail wings 20 are quite similar to the front top fuselage narrow shelf member 4 as both wings have a top surface as an extension sideways of the fuselage top surface. Wings 20 are used to ride the swirling side slip-streams and to prevent it from going up over the fuselage top surface, thereby helping with the fuselage lift as a wing. Right and left vertical fins 21 are located as shown in Figures 1 and 2 and they are attached to wings 3 to prevent the right and left slipstreams from turning in over the rear end of the fuselage to interfere with the low air density there.

The axis of rotation of my side propellers, as shown in Fig. 1, will direct the slip-streams in towards the fuselage rear end, thereby overcoming the drag common with most airplanes.

The propeller and cowl ring unit is removed from the right side of the fuselage as shown in Fig. 1. A cross drive shaft 23 is shown with drive bevel gear 24 thereon at its right end and the driven bevel gear 25 is secured on a short propeller drive shaft 26. Drive bevel gear 27 is shown with driven bevel gear 28, which in turn drives the rear propeller shaft 29, which in turn drives the rear propeller blades 30. The rear elevator is shown by 32 and rudder by 33. An airpassage shown in Fig. 12 is indicated by 35. A two way air valve is indicated by 36. Arrows 38 indicates air ports in the fuselage top surface and is located in advance of the aircraft's center of gravity. Arrows 39 also indicates the flow of air into air ports in the fuselage top surface and is located to the rear of arrows 38. The movement of the two way air valve 36 will vary the air suction at the two air ports in the fuselage top surface, thereby effecting the lift influence forward and back as the case may be for longitudinal control.

Reference is now made to Figures 5 and 7, shaft 8 has secured thereon member 40 by setscrews. Control arm 41 is pivotly secured to member 40 by bearing screws 42. The lower part of the control arm 41 has right and left handles as shown by 43 in Fig. 7. Pilot and copilot seats are indicated by 44 and 44. A pendulum arm is indicated by 45 the same is pivotly supported to the upper end of the control arm 41 in a manner to swing forwards and backwards. A saddle member is indicated by 47 having a thumb screw. Lead washers 48 may be used for weight and made like a lock nut washer to be bent when placed on the saddle 47 and around the pendulum arm 45. The weight may be varied by adding or taking off washers. While I would recommend lead washers be used other material and shapes could be used. On the lower end of the pendulum arm 45 is a locking member 49 the same goes over a curved tubular rod 50. Within this locking member 49 are two springs 51 placed on the rod 50, also two triggers 52 with openings at their upper ends slide over the rod 50 and are placed between the springs 51. A handle 53 is located below the locking member 49. By pressing the triggers 52 to the handle 53 will release the hold the triggers have on rod 50 thereby a new adjustment may be made. Thumb screw 55 located at the forward end of rod 50 is the means to clamp an indicator finger 56 in an in-and-out position.

A dial plate is indicated by 58; the same is to be attached to some fixed part of the aircraft as indicated by the screw head. Markings, as bull's-eye and circles with right and left parallel lines, are shown in Fig. 6, the same would give the pilot the information as to the positions of the controls with respect to the pendulum movements by observing the indicator finger position over the dial.

By placing the indicator finger 56 in a known position, as an in-and-out position, to a mark thereon shown in Fig. 15, a pilot would know then what adjustment to set the pendulum arm in relation to the control arm and have the indicator finger remain close to the bull's-eye when he desires a certain angle of climb or angle decline or level flight to take place.

The gyropilot, "iron mike," is an important factor in making aviation safe. The same is expensive, has weight and requires attention to keep its many parts in order. Due to the cost it will never be used on all airplanes. My lead weights should be far lighter than all the parts of the "iron mike."

Airplane builders equipping their airplanes with my pendulum and control arm may leave off some expensive panel instruments; yet the pilots flying such airplanes should be able to fly them blind by night.

Arms 41 and 45 are preferably made of tubular metal. Objections may be made that there may be times when my automatic pendulum feature is not desired, as on a diving airplane. To overcome this objection I have provided a way to wind up my weight by the use of a winding drum 60 placed in any convenient place as at the side of a pilot's seat where either pilot or copilot may crank it. A cable 61 from this drum 60 may join a second cable 62 and then pass around suitable pulleys as at 63 and 64 and then come down at the right and left sides of the pendulum arm 45 and be secured to the saddle 47. Small wells in the sides of the pendulum arm would be suitable places for the thumb screw to engage said arm to prevent the saddle and weight from sliding down. At times when desired the weight and saddle may be secured by said thumb screw at any desired height on the pendulum arm.

The several parts shown to the right of the pendulum arm 41 in Fig. 5 show in detail their shapes. The control rod 66 is pivotly connected to the control arm 41 at its forward end by parts 68 and 68; the same are held together by suitable bolts. Split collars 70 with setscrews are placed above and below the forward end bearing of the control rod to hold the rod in any desired adjustable height. Grooved rollers 69 are secured in a fixed manner to the aircraft, and its duty is to support the control rod 66 to allow for a back and forth movement and a twisting movement as well. Split collars 70, placed at either side of the rollers 69 and secured in an adjustable manner to the control rod by setscrews, will limit the swing of the pendulum arm and control arm.

A universal joint is indicated by 72 which connects rod 66 to rod 73. Rod 73 connects up with the arm 74 that controls the movements of the two way air valve 36 and then the rod extends backwards to the arm 75 on the rear elevator 32. A ball joint may be used where the rod 73 connects with arms 74. A double armed member is indicated by 77. The same is shown in Figures 3 and 4 and secured on rod 73. The same is used to operate the top and bottom right and left ailerons 81 through cables 78 and bell arms 76. Single arm members 80 are secured to rod 73 and are shown in Figures 3, 9, 10 and 11.

Air valves for the right wings are indicated by 83A and 83B; the air valves for the left wings are indicated by 84A and 84B. That is, the letter A stands for air valves in the airdrainage system in the lower front wings while the letter B stands for air valves in the airdrainage system in the back upper wings. In normal flight it is advisable that the air valves 83A, 83B, 84A, and 84B be wide open and any valve turned to shut off the suction air flow as a need arises for lateral and longitudinal control. The reduction of the air flow at any one of the wing ports will lower the lift influence of that wing. When the control arm 41 is turned sideways rod 73 has also made a twist movement thus causing member 80A and 80B to turn, and in turning will tend to close, by the use of cables, either valves 83A and 83B or valves 84A and 84B as the case may be; this movement will make for lateral control.

Now my aircraft's front lower wings are located in front of the aircraft's center of gravity and my aircraft's upper back wings are located back of the aircraft's center of gravity; therefore, by closing the right and left air valves A in the lower front wings, a reduced lift influence will be in effect causing the aircraft to nose down. In the same manner by closing the B valves the aircraft nose will tend to rise.

Each A and B valves are held wide open by springs as shown in Fig. 9. One of the ends of the springs are attached to a fixed part of the aircraft as indicated by parallel lines. In Fig. 10 the one armed member 80 is shown turned to the right leaving the right valve wide open by a slack cable 85 while the left valve is closed by a tight cable 85. In Fig. 11 the member 80 is shown turned to the left leaving the left valve wide open while the right valve is closed. This movement takes care of lateral control.

Fig. 8 shows how I accomplish longitudinal control: the same is by closing all of valves A or by closing all of valves B, as the case may be, by moving rod 73 forward as shown by arrow 97 or backward as shown by arrow 98, by the control arm when it swings forward or backward. Grooved pulleys 91 and 92 are all pivotly secured to the aircraft in a fixed place, while pulleys 93 and 94 are held in place in part by cables 95 and 96 attached to the bearing or swinging arm 99 which supports the pulleys 93 and 94 in back and forth moveable positions. When rod 73 moves forward as indicated by arrow 97, pulleys 94 and 94 will be pulled out of its normal position, as shown by the broken line, thus pulling both cables 96, which in turn pulls cables 85 to the B valves, thus the aircraft will tend to right itself and its nose to come up. The reverse will be the case when rod 73 moves as indicated by arrow 98.

Why all this valve construction and use? Answer, because there is a need to control my aircraft and make it airworthy at a time when it is moving very slowly in the air, far too slow to make normal ailerons and conventional elevators be of any use.

A pilot may watch the indicator finger's (56) position over the dial, as shown in Figures 5 and 6 and thereby know the balanced position of the aircraft.

Various changes, proportion and the minor details of construction may be resorted to without departing from the principle or sacrificing any of the advantages of the claimed invention.

Having described my invention, what I claim is:

1. An aircraft having wings supplied with lateral controls and a fuselage supplied with longitudinal controls, a control arm means pivotally suspending said control arm from near the fuselage's roof, means connecting said control arm with the said lateral and longitudinal controls, a pendulum arm means pivotally suspending said pendulum arm from the upper part of the control arm and provided with a weight at its lower end, a dial, an indicator finger, a connecting link member, a locking member secured to the lower portion of said pendulum arm, said connecting link member mounted on the lower part of the control arm and passing through said locking member, said indicator finger secured at the forward end of the connecting link member, said dial is located below and adjacent to the indicator finger and secured in a fixed manner to the aircraft for the purpose set forth.

2. An aircraft as defined in claim 1 wherein said connecting link member is tubular in shape and houses a rod from said indicator finger, a clamping member on the forward end of said connecting link member holds the rod from said indicator finger in place, whereby when the clamping member is released the indicator finger may be moved forward or backward as the indicator rod is moved in or out of the tubular connecting link member for the purpose set forth.

3. An aircraft having wings supplied with lateral controls and a fuselage supplied with longitudinal controls, a control arm, means pivotally suspending said control from near the roof of the fuselage, means connecting said control arm with the said lateral and longitudinal controls, a pendulum arm, means pivotally suspending said pendulum arm from the upper part of the control arm, a connecting link member mounted on the lower part of the control arm and secured to the lower part of the pendulum arm in an adjustable manner, a saddle member surrounding the pendulum arm, a weight member supported on the said saddle member, means to slidably raise and lower the said saddle member with the weight member on the pendulum arm; whereby the weight on the saddle may be moved up with the saddle to the top of the pendulum arm at a time when the automatic control feature is not desired and lowered to the lower part of the pendulum arm when the automatic control feature is desired.

4. An aircraft having a fuselage of cabin pattern, right and left main wings, narrow shelf member secured to the upper front part of the fuselage and extends out beyond both the front and sides as an extension of the fuselage's roof outward, means mounting a shaft with its middle part at the ceiling of the cabin, said shaft passing out sideways through said narrow shelf member, right and left tiltable wings mounted on the outer ends of said shaft, a dependent arm secured to said shaft within the cabin, a pendulum journalled on said arm adjacent to said shaft, a weight mounted on the lower end of said pendulum and means to adjustably fix said pendulum relative to said arm whereby the effect of said pendulum on said tiltable wings may be adjusted and the trim of the aircraft altered.

5. An aircraft fuselage having right and left main wings, right and left front tiltable wings located in advance of the aircraft's center of gravity and in advance of the main wings and enveloping and rigidly secured to the outer ends of a shaft, means mounting said shaft at right angles to the longitudinal axis of the fuselage with its middle part close to and beneath the fuselage roof and near its forward part, a rear elevator secured pivotally to the fuselage's most backward part, a depending control arm mounting on said shaft beneath the fuselage roof at its middle part, a pendulum arm journalled at the upper end of the control arm and provided to support a weight at its lower end, means adjustably securing said pendulum arm to said control arm, means to connect the control arm with said rear elevator, whereby said tiltable wings support a portion of the aircraft's weight while in flight and by altering their angle of attack by the use of the pendulum arm together with the control arm a change in the lift influence takes place by the tiltable wings in front of the aircraft's center of gravity, in flight a weight secured to the pendulum arm acts as the influence that tends automatically to control the aircraft in longitudinal balance by both the tiltable wings and the rear elevator.

6. An aircraft having wing and fuselage parts, an elevator at the rear end of said fuselage, said fuselage of inclosed cabin pattern, a control arm suspended pivotally from near the roof of the cabin, a pendulum arm suspended pivotally from the upper part of the control arm and provided for a weight at its lower end, a connecting link member, a handle and a locking member secured to the lower portion of said pendulum arm, said connecting link member mounted on the lower part of the control arm and passes through the said locking member, a handle secured to the lower portion of said control arm, a pilot's seat located within the cabin in a fixed position adjacent to the arms, means connecting said control arm with said elevator; whereby when the aircraft is moving on the ground or on the water or in air the pilot may as the need arises take hold by one hand the handle which is secured to the control arm and with the other hand release the locking member and then move the pendulum arm into a new location on the connecting link member and then relock the pendulum arm in its new position, then both hands may be removed, a weight on the lower part of the pendulum arm acts as the influence to automatically control the aircraft longitudinally.

7. An aircraft having wings with ailerons and fuselage of inclosed cabin pattern, an elevator at the rear end of the fuselage, a control arm suspended pivotally beneath the roof of the cabin, a pendulum arm suspended pivotally from the upper part of the control arm the same being provided with a weight at its lower part, a handle and a locking member secured to the lower portion of the pendulum arm, a connecting link member attached to the lower part of the control arm and passing through the said locking member, a handle secured to the lower portion of said control arm, a pilot's seat located within the cabin in a fixed position adjacent to the pendulum arm and the control arm, means connecting said control arm with said ailerons and means connecting said control arm with said elevator; whereby when the aircraft is in flight the pilot may as the need arises take hold of the control arm and move the two arms sideways thereby moving the ailerons for lateral control, and for changing the angle of attack of the wings the pilot holds the control arm's handle by one hand while his other hand holds the handle on the pendulum arm unlocks the locking member and then moves the pendulum arm into a new position on the connecting link and then relocks the arms together, that being done both hands may be removed from the handles to let the weight do its work by itself automatically.

8. An aircraft having wings with ailerons and fuselage parts, an elevator at the rear end of the fuselage, a control arm suspended pivotally from a fixed part of the fuselage, a pendulum arm suspended pivotally from the upper part of the control arm the same being provided with a weight at its lower part, a control rod and cables, a forked bearing connecting the control rod to the control arm, means for adjusting the said forked bearing up or down along the said control arm, means connecting the rear end of said control rod to the rear elevator, means connecting said cables to the control rod at one of their ends and means connecting said members to the said ailerons at their other ends; whereby when the control arm is moved forward or backward by hand or by gravity influence the control rod also moves forward or backward thereby turning the rear elevator for longitudinal control, and whereby when the control arm is moved by hand or by gravity influence from one side to the other side a twist movement occurs of the control rod which turns the member on the control rod and in turn moves the cables that turns the ailerons for lateral control.

9. An aircraft as defined in claim 8 including a guide means for said control rod mounted on the structure part of the aircraft and adjustable motion limiting members mounted on said control rod at each side of said guide means whereby back and forth movement of said control and pendulum arm is limited.

10. An aircraft having wing and fuselage parts, longitudinal and lateral control members, a control arm suspended pivotally from a fixed part of the aircraft, a pendulum arm suspended pivotally from the upper part of the control arm and provided to support a weight on its lower part, means joins the control arm with the pendulum arm at their lower parts, an indicator finger mounted on the said means that joins the said arms, a dial secured to a fixed part of the aircraft beneath and adjacent the indicator's finger, and means connect the said control arm to said longitudinal and lateral control members; whereby when the aircraft is in flight the location of the indicator finger over the dial will indicate to the pilot the balanced or unbalanced position of the aircraft.

11. An aircraft having a fuselage of cabin pattern, right and left main wings, right and left tiltable wings, narrow shelf member secured to the upper front part of the fuselage and extends out beyond the front and extends out beyond the sides as an extension of the fuselage's roof, a pendulum arm with a weight on its lower part is pivotly supported to the upper part of a control arm, the two arms are adjustably secured together at their lower parts, a shaft with its middle part within the fuselage cabin next to the ceiling and passing out sideways through said narrow shelf member into said tiltable wings and rigidly secured thereto, said control arm is secured to the middle part of the shaft to turn the shaft clockwise and anti-clockwise and thus the tiltable wings' (7) angle of attack is altered and its lift influence varied thereby controlling the aircraft longitudinally by the influence of said weight.

HERBERT ELLWOOD IRWIN.